(12) United States Patent
Smith et al.

(10) Patent No.: US 11,466,575 B2
(45) Date of Patent: *Oct. 11, 2022

(54) COMPONENT FOR A GAS TURBINE ENGINE WITH A FILM HOLE

(71) Applicant: General Electric Company, Schenectady, NY (US)

(72) Inventors: Aaron Ezekiel Smith, Montgomery, OH (US); Metodi Blagoev Zlatinov, San Francisco, CA (US); Thomas Earl Dyson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/122,536

(22) Filed: Sep. 5, 2018

(65) Prior Publication Data
US 2019/0003314 A1 Jan. 3, 2019

Related U.S. Application Data

(63) Continuation of application No. 14/938,261, filed on Nov. 11, 2015, now Pat. No. 10,094,226.

(51) Int. Cl.
*F01D 5/18* (2006.01)

(52) U.S. Cl.
CPC ........ *F01D 5/186* (2013.01); *F05D 2260/202* (2013.01); *Y02T 50/60* (2013.01)

(58) Field of Classification Search
CPC .. F01D 5/186; F05D 2260/202; Y02T 50/672; Y02T 50/676
See application file for complete search history.

(56) References Cited

U.S. PATENT DOCUMENTS

| | | | | |
|---|---|---|---|---|
| 5,688,104 A | * | 11/1997 | Beabout | F01D 5/187 415/115 |
| 6,176,676 B1 | * | 1/2001 | Ikeda | F01D 5/186 137/806 |

(Continued)

FOREIGN PATENT DOCUMENTS

| | | |
|---|---|---|
| CA | 2 785 974 A1 | 7/2011 |
| CN | 1932263 A | 3/2007 |

(Continued)

OTHER PUBLICATIONS

Chinese Patent Office, Decision on Rejection including English translation issued in related Chinese Appln. No. 201610994184.7 dated Sep. 9, 2019.

(Continued)

*Primary Examiner* — Justin D Seabe
*Assistant Examiner* — Adam W Brown
(74) *Attorney, Agent, or Firm* — McGarry Bair PC

(57) ABSTRACT

A component is provided and comprises at least one wall comprising a first and a second surface. At least one film cooling hole extends through the wall between the first and second surfaces and has an outlet region at the second surface. The film cooling hole includes a first expansion section being a side diffusion portion and a second expansion section being a layback diffusion portion, wherein the side diffusion portion is upstream and spaced from the layback diffusion portion.

19 Claims, 6 Drawing Sheets

(56) References Cited

U.S. PATENT DOCUMENTS

| | | | | |
|---|---|---|---|---|
| 7,300,251 | B2* | 11/2007 | Kitamura | F01D 5/186 416/232 |
| 7,997,866 | B2* | 8/2011 | Naik | F01D 5/186 416/97 R |
| 8,057,180 | B1 | 11/2011 | Liang | |
| 8,057,181 | B1 | 11/2011 | Liang | |
| 8,262,357 | B2 | 9/2012 | Mhetras | |
| 8,328,517 | B2* | 12/2012 | Liang | F01D 5/186 416/231 R |
| 8,672,613 | B2 | 3/2014 | Bunker | |
| 8,905,713 | B2* | 12/2014 | Bunker | F01D 5/186 416/97 R |
| 8,961,136 | B1* | 2/2015 | Liang | F01D 5/187 415/115 |
| 10,094,226 | B2* | 10/2018 | Smith | F01D 5/186 |
| 2011/0158820 | A1* | 6/2011 | Chamberlain | B23H 9/10 416/97 R |
| 2013/0315710 | A1* | 11/2013 | Kollati | F01D 5/181 415/116 |
| 2014/0099189 | A1* | 4/2014 | Morris | F01D 5/186 415/115 |

FOREIGN PATENT DOCUMENTS

| | | |
|---|---|---|
| CN | 1982654 A | 6/2007 |
| EP | 2568118 A1 | 3/2013 |
| JP | 2011064207 A | 3/2011 |
| WO | 2007/052337 A1 | 5/2007 |
| WO | 2013122906 A1 | 8/2013 |

OTHER PUBLICATIONS

Chinese Patent Office, Third Office Action including English translation issued in related Chinese Appln No. 201610994184.7 dated Mar. 27, 2019.

Extended European Search Report and Opinion issued in connection with corresponding EP Application No. 16198034.7 dated Mar. 10, 2017.

Machine translation and Notification of Reasons for Refusal issued in connection with corresponding JP Application No. 2016-214744 dated Sep. 5, 2017.

Machine translation and First Office Action and Search issued in connection with corresponding CN Application No. 201610994184.7 dated Dec. 29, 2017.

* cited by examiner

COMPONENT FOR A GAS TURBINE ENGINE WITH A FILM HOLE

CROSS-REFERENCE TO RELATED APPLICATION

This application is a continuation of U.S. patent application Ser. No. 14/938,261, filed on Nov. 11, 2015, titled "COMPONENT FOR A GAS TURBINE ENGINE WITH A FILM HOLE", now U.S. Pat. No. 10,094,226, which is hereby expressly incorporated herein by its entirety.

BACKGROUND OF THE INVENTION

The invention relates generally to gas turbine engines, and, more specifically, to film cooling therein. In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin metal walls of high strength superalloy metals are typically used for enhanced durability while minimizing the need for cooling thereof. Various cooling circuits and features are tailored for these individual components in their corresponding environments in the engine. In addition, all of these components typically include common rows of film cooling holes.

A typical film cooling hole is a cylindrical bore inclined at a shallow angle through the heated wall for discharging a film of cooling air along the external surface of the wall to provide thermal insulation against the hot combustion gases which flow thereover during operation. The film is discharged at a shallow angle over the wall outer surface to minimize the likelihood of undesirable blow-off thereof, which would lead to flow separation and a loss of the film cooling effectiveness.

Film performance is dictated by effective coverage. If the diffuser is too aggressive in expansion, it results in the flow stalling and a degree of jetting at the outlet of the diffuser. This jetting is detrimental as it reduces the effective coverage of the film and introduces secondary mixing that degrades the film. The side diffusion angle and length govern the physical coverage of the diffuser at the outlet. The layback diffusion angle governs how the film transitions from the covered diffusion portion to the mainstream flow.

BRIEF DESCRIPTION OF THE INVENTION

In one aspect of the invention, embodiments of the invention relate to a component for a gas turbine engine comprising a hot side exposed to a hot air flow, a cool side exposed to a cooling air flow, and a film hole passage extending between the cool side and the hot side wherein an inlet is located on the cool side and an outlet on the hot side. A side diffusion length is defined by a length between a start of the side diffusion portion and the outlet. A layback length is defined by a length between a start of the layback diffusion portion and the outlet. In the embodiments the side diffusion length is greater than the layback diffusion length.

In another aspect of the invention, embodiments of the invention relate to a film hole passage for a component, with a cool and hot side, of a gas turbine engine having an inlet on the cool side, an outlet on the hot, a side diffusion portion, and a layback diffusion portion, wherein the side diffusion portion is upstream and spaced from the layback diffusion portion.

In another aspect of the invention, embodiments of the invention relate to a film hole passage for a component, with a cool and hot side, having an inlet on the cool side, an outlet on the hot, a side diffusion portion, and a layback diffusion portion, wherein the side diffusion portion is upstream and spaced from the layback diffusion portion, and the layback diffusion portion defines a layback diffusion length which is less than 4 times the diameter of a metering section of the film hole.

DESCRIPTION OF EMBODIMENTS OF THE INVENTION

The described embodiments of the present invention are directed to a film-cooled engine component, particularly in a gas turbine engine. For purposes of illustration, aspects of the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
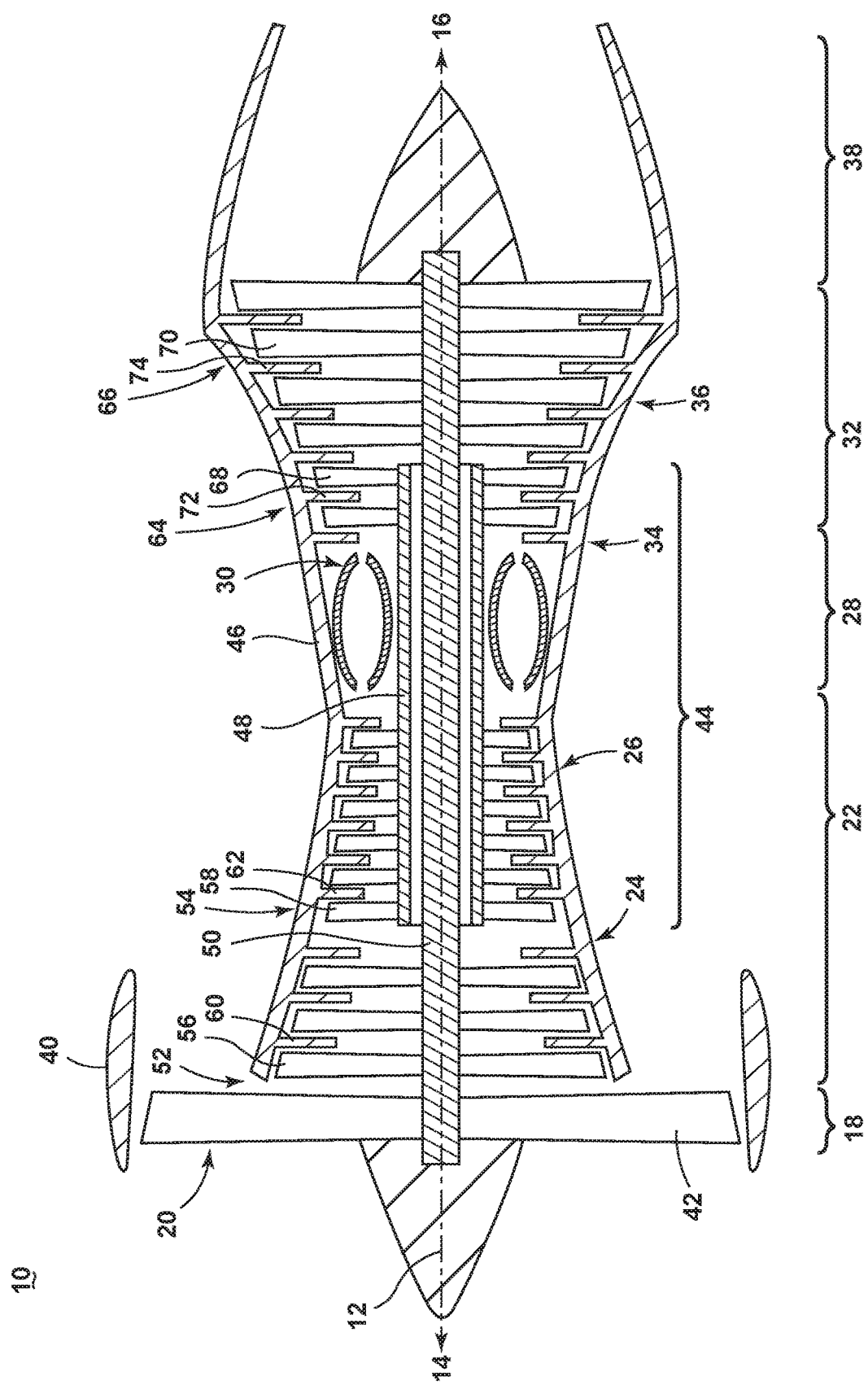
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by a core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
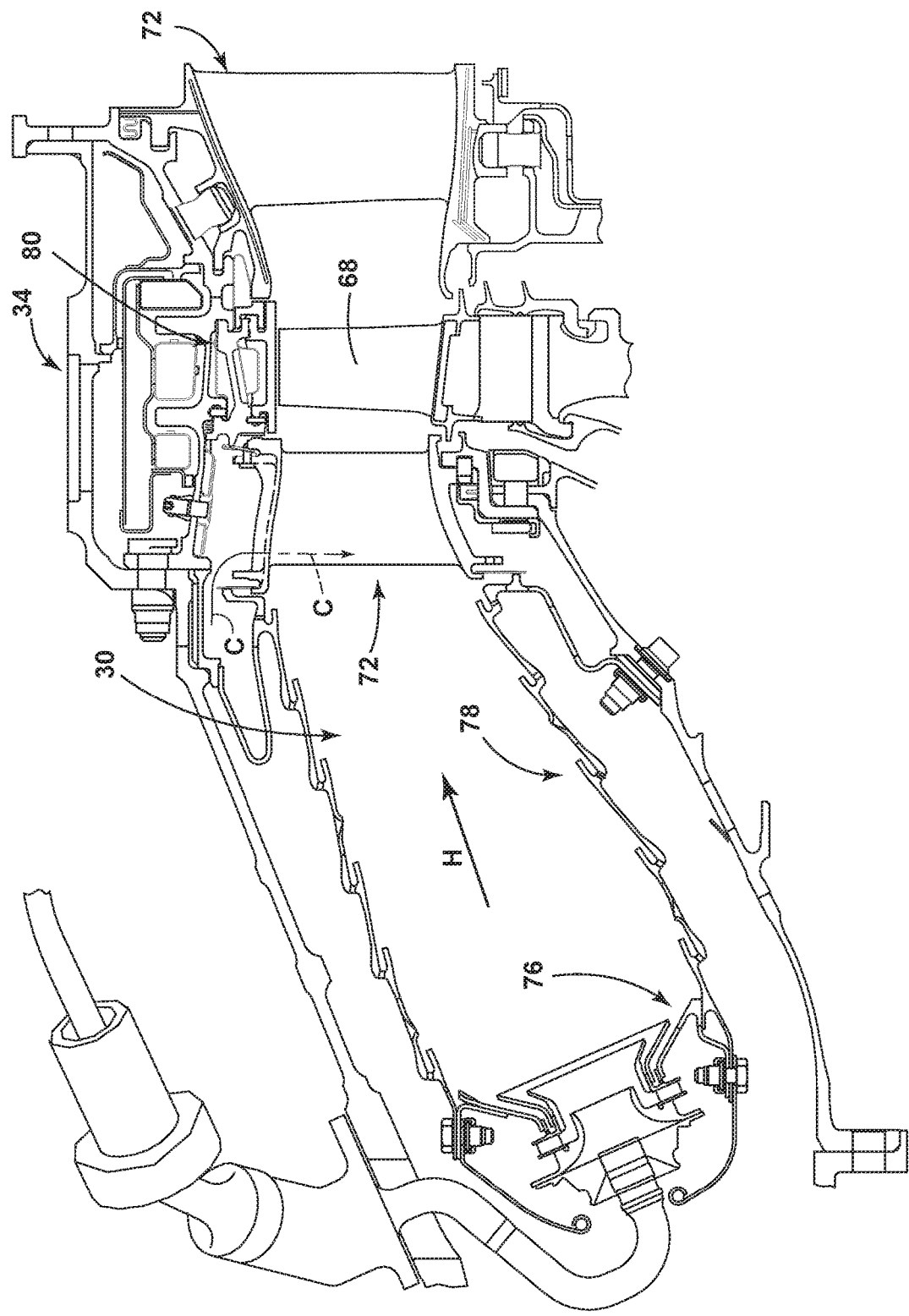
FIG. 2 is a side section view of a combustor and a high pressure turbine of the engine from FIG. 1.

FIG. 2 is a side section view of the combustor 30 and HP turbine 34 of the engine 10 from FIG. 1. The combustor 30 includes a deflector 76 and a combustor liner 77. Adjacent to the turbine blade 68 of the turbine 34 in the axial direction are sets of radially-spaced, static turbine vanes 72, with adjacent vanes 72 forming nozzles therebetween. The nozzles turn combustion gas to better flow into the rotating blades so that the maximum energy may be extracted by the turbine 34. A cooling air flow C passes through the vanes 72 to cool the vanes 72 as hot air flow H passes along the exterior of the vanes 72. A shroud assembly 78 is adjacent to the rotating blade 68 to minimize flow loss in the turbine 34. Similar shroud assemblies can also be associated with the LP turbine 36, the LP compressor 24, or the HP compressor 26.

One or more of the engine components of the engine 10 includes a film-cooled substrate in which a film cooling hole, or film hole, of an embodiment disclosed further herein may be provided. Some non-limiting examples of the engine component having a film-cooled substrate can include the blades 68, 70, vanes or nozzles 72, 74, combustor deflector 76, combustor liner 77, or shroud assembly 78, described in FIGS. 1-2. Other non-limiting examples where film cooling is used include turbine transition ducts and exhaust nozzles.

Figure 3:
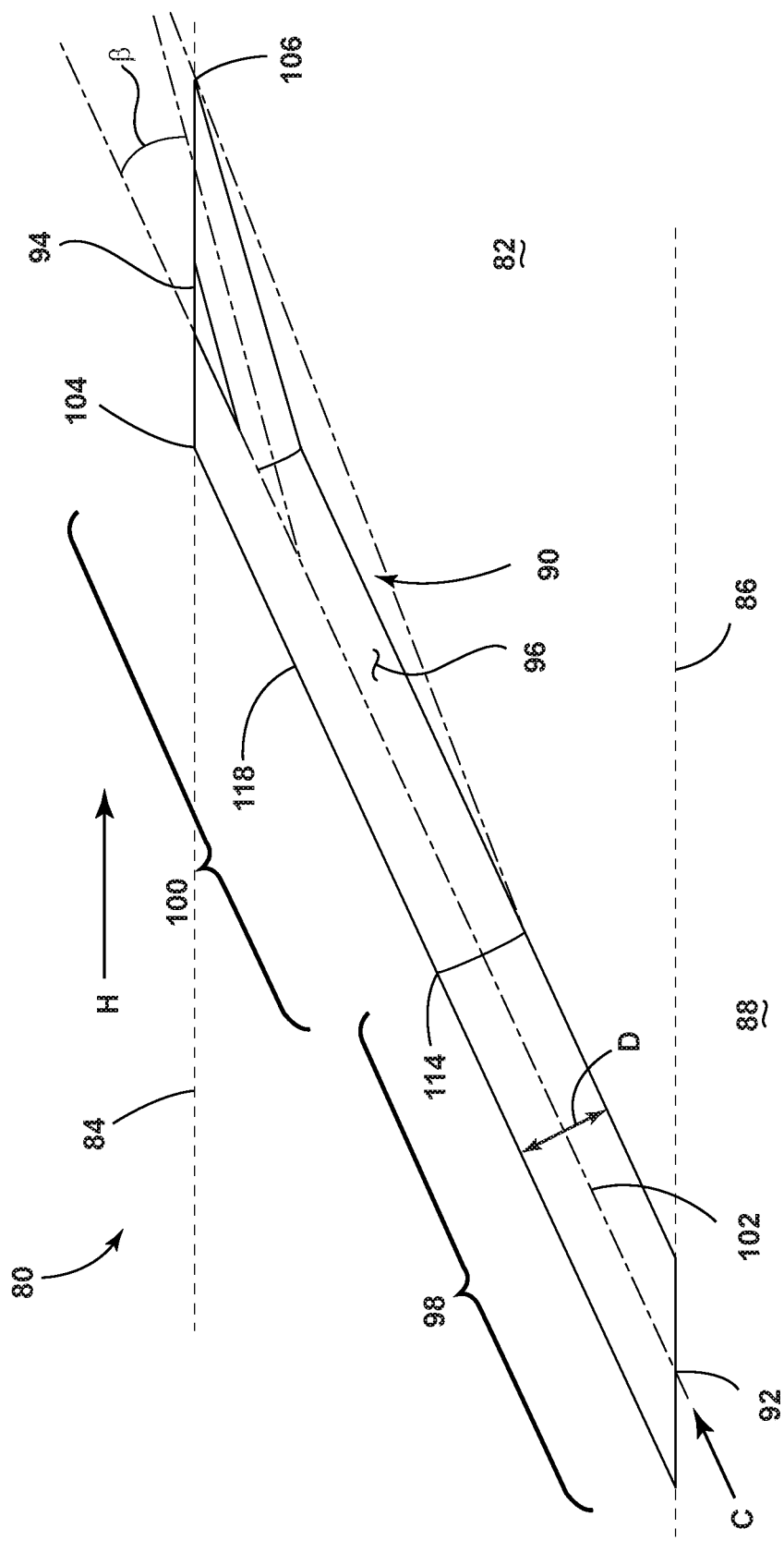
FIG. 3 is a sectional view through a film hole of an engine component of the engine from FIG. 1 according to a first embodiment of the invention.

FIG. 3 is a schematic, sectional view showing a portion of an engine component 80 according to an embodiment of the invention. The engine component 80 may be an engine component of the engine 10 from FIG. 1, and can be disposed in a flow of hot gas represented by arrow H. A cooling air flow, represented by arrow C may be supplied to cool the engine component. As discussed above with respect to FIGS. 1-2, in the context of a turbine engine, the cooling air can be ambient air supplied by the fan 20 which bypasses the engine core 44, air from the LP compressor 24, or air from the HP compressor 26.

The engine component 80 includes a substrate 82 having a first surface being a hot side 84 facing the hot air flow H and a second surface being a cool side 86 facing the cooling fluid C. The substrate 82 may form a wall of the engine component 80; the wall may be an exterior or interior wall of the engine component 80. The first engine component 80 can define at least one interior cavity 88 comprising the cool side 86. The hot side 84 may be an exterior surface of the engine component 80. In the case of a gas turbine engine, the hot side 84 may be exposed to gases having temperatures in the range of 1000° C. to 2000° C. Suitable materials for the substrate 82 include, but are not limited to, steel, refractory metals such as titanium, or superalloys based on nickel, cobalt, or iron, and ceramic matrix composites. The superalloys can include those in equi-axed, directionally solidified, and single crystal structures.

The engine component 80 further includes one or more film hole(s) 90 extending through the substrate 82 that provide fluid communication between the interior cavity and the hot side 84 of the engine component 80. During operation, the cooling air flow C is supplied to the interior cavity 88 and out of the film hole 90 to create a thin layer or film of cool air on the hot side 84, protecting it from the hot air flow H. While only one film hole 90 is shown in FIG. 3, it is understood that the engine component 80 may be provided with multiple film holes 90, which be arranged in any desired configuration on the engine component 80.

It is noted that, in any of the embodiments discussed herein, although the substrate 82 is shown as being generally planar, it is understood that that the substrate 82 may be curved for many engine components 80. However, the curvature of the substrate 82 may be slight in comparison to the size of the film hole 90, and so for the purposes of discussion and illustration, the substrate 82 is shown as planar. Whether the substrate 82 is planar or curved local to the film hole 90, the hot and cool sides 84, 86 may be parallel to each other as shown herein, or may lie in non-parallel planes.

The film hole 90 can have an inlet 92 provided on the cool side 86 of the substrate 82, an outlet region comprising an outlet 94 provided on the hot side 84, and a film hole passage 96 connecting the inlet 92 and the outlet 94. The film hole passage 96 can include a metering section 98 for metering of the mass flow rate of the cooling air flow C, and a diffusing section 100 in which the cooling fluid C is expanded to form a wider and slower cooling film on the hot side 84. The metering section 98 can be a portion of the film hole passage 96 with the smallest cross-sectional area perpendicular to the direction of cooling air flow C through the film hole passage 96. The metering section 98 may be a discrete location at which the film hole passage 96 has the smallest cross-sectional area, or an elongated section of the film hole passage 96. The diffusing section 100 is downstream of the metering section 98 with respect to the direction of cooling air flow C through the film hole passage 96. The diffusing section 100 may be in serial flow communication with the metering section 98. The metering section 98 can be provided at or near the inlet 92, while the diffusing section 100 can be defined at or near the outlet 94. In most implementations, the diffusing section 100 defines the outlet 94.

The cooling air flow C through the film hole passage 96 is along the longitudinal axis of the film hole passage 96, also referred to herein as the centerline 102, which passes through the geometric center of the cross-sectional area of the metering section 98. The film hole 90 can be inclined in a downstream direction of cooling air flow C through the film hole passage 96 such that the centerline 102 is non-orthogonal to the hot and cool sides 84, 86. Alternatively, the film hole 90 may have a centerline 102 that is orthogonal to one or both of the hot and cool sides 84, 86 in the localized area of the substrate 82 through which the centerline 102 passes. In other embodiments, the centerline 102 of the film hole 90 may not be oriented in the direction of the hot air flow H, such that the vector of the cooling air flow C differs from that of the hot air flow H. For example, a film hole that has a compound angle defines a cooling flow vector that differs from the hot air flow vector not only in cross section, but also in the top-down view looking at the hot side 84.

In the embodiment of FIG. 3, D is the metering diameter defined by the metering section 98 of the film hole 90. The metering section 98 is generally circular in cross-section and has a diameter less than 0.48 inches. However the specific cross-sectional shape of the metering section 98 may differ for other embodiments of the invention; for example, the cross-sectional shape of the metering section 98 may be rectangular or elliptical. For non-circular metering sections 98, the metering diameter D may be the hydraulic diameter of the cross-section, which is defined commonly as four times the cross-sectional area divided by the cross-sectional perimeter. For very irregular metering sections 98 that still are generally circular, such as those commonly produced by percussion laser machining, the metering diameter D may be the diameter of the largest circular pin that can be passed through the metering section 98 without damage. For non-circular sections that also have irregular surfaces, the metering diameter D may be the hydraulic diameter of the appropriately shaped largest pin that can be passed through without damage. For non-straight or non-constant cross section lengths prior to the diffusion section 100, the same overall definitions may be used at the minimum cross sectional area location.

The outlet 94 includes an upstream edge 104 and a downstream edge 106 at which the film hole passage 96 intersects the hot side 84 of the substrate 82. The edges 104, 106 can generally be defined relative to the direction of the hot air flow H, with the hot air flow H generally defining an upstream direction 108 and a downstream direction 110 relative to the hot side 84, i.e. past the outlet 94. The upstream edge 104 generally faces the downstream direction 110 and the downstream edge 106 generally faces the upstream direction 108.

Figure 4:
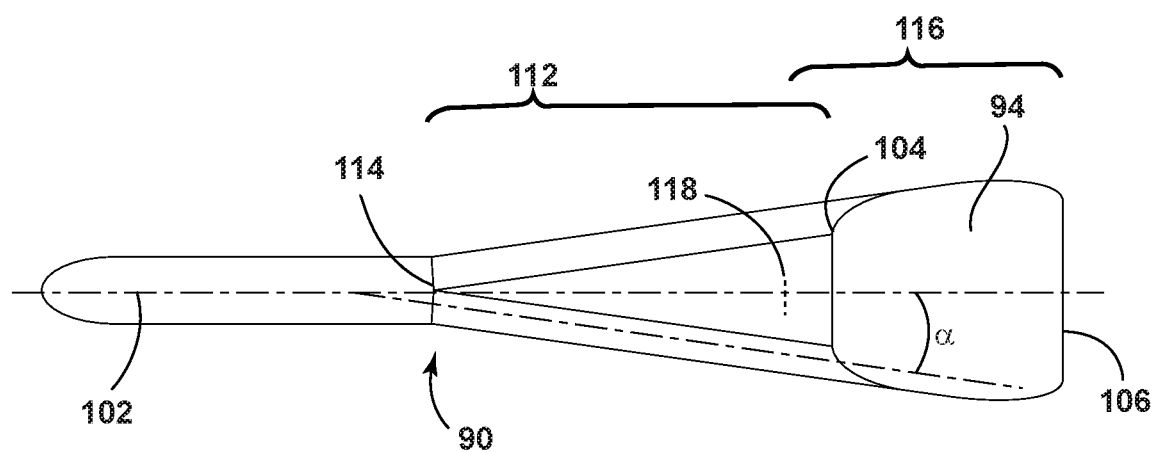
FIG. 4 is a top view of the film hole.
Figure 5:
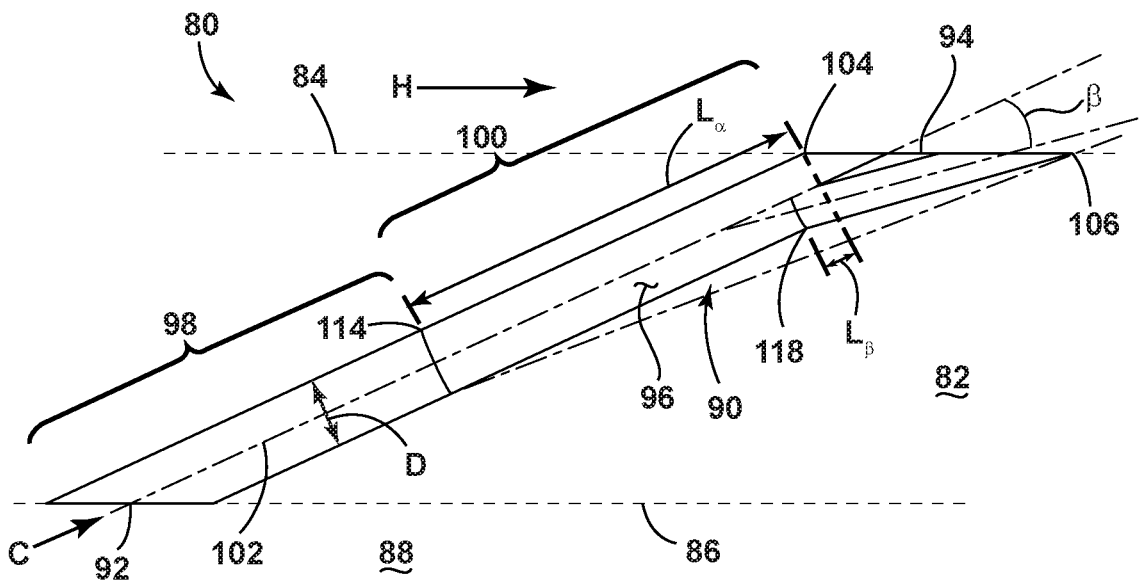
FIG. 5 is FIG. 3 stacked with FIG. 4 and FIG. 6.
Figure 6:
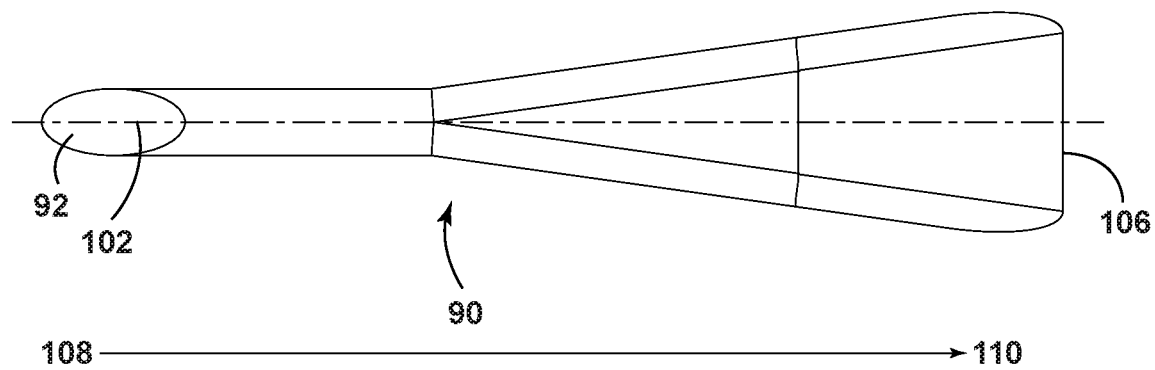
FIG. 6 is a bottom view of the film hole.
Figure 7:
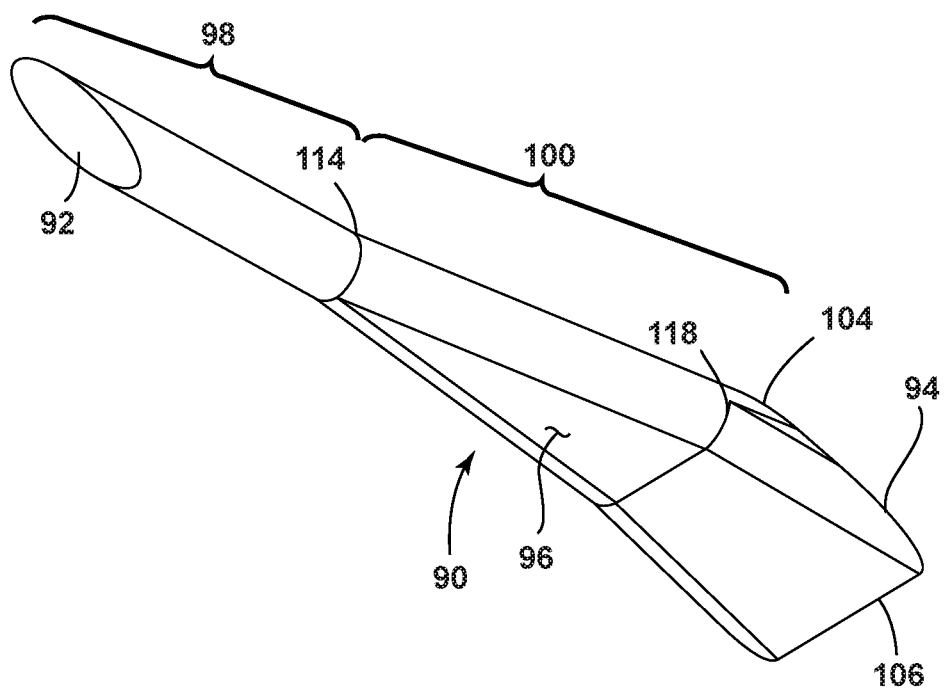
FIG. 7 is a bottom perspective view of the film hole.

In the embodiment of FIGS. 4-6, which illustrate the void defined by the film hole 90 of FIG. 3, the diffusing portion 100 further comprises a side diffusion portion 112 and a layback diffusion portion 116. The side diffusion portion 112 is upstream relative to the outlet 94 and spaced from the layback diffusion portion 116. Spaced meaning that the two diffusion portions begin at different points within the film hole passage 96 with the side diffusion portion 112 beginning upstream 108 of the layback diffusion portion 116. The side diffusion portion 112 begins where the metering section 98 ends defining a start 114 of the side diffusion portion 112 and ends at the outlet 94.

The side diffusion portion 112 further defines a side diffusion length La running parallel to the centerline 102 from the start 114 to the upstream edge 104. The side diffusion portion 112 further defines a side diffusion angle α which expands from the start 114 at a shallow angle measured from the centerline 102 and terminating at the outlet 94. In some embodiments, the side diffusion angle α is less than 12.5 degrees.

Figure 8:
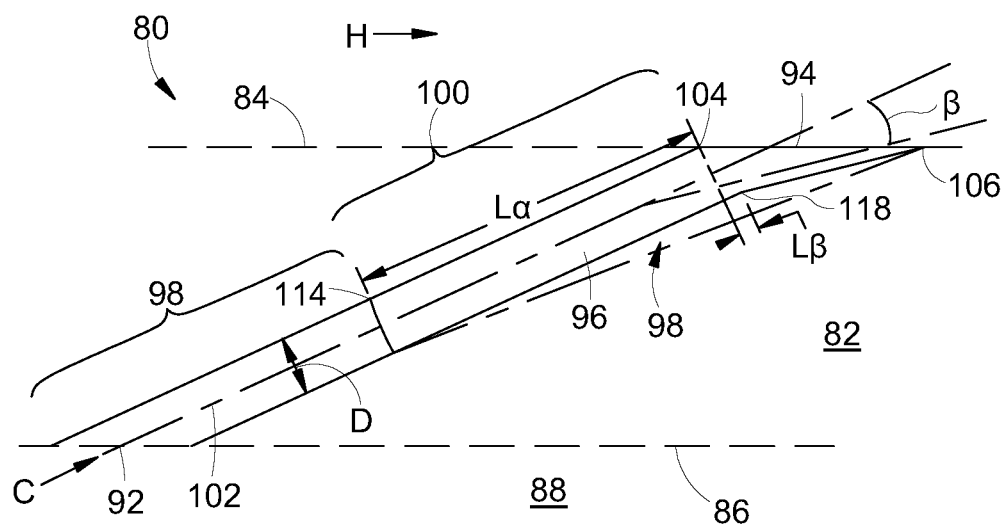
FIG. 8 is a sectional view through a film hole of an engine component of the engine from FIG. 1 according to an embodiment of the invention.

The layback diffusion portion 116 begins at a point downstream of the start 114 of the side diffusion portion 112 but upstream of the outlet 94. The layback diffusion portion ends at the outlet 94. The layback diffusion portion 116 further defines a layback diffusion length $L_\beta$ running parallel to the centerline 102 from the second start 118 to the upstream edge 104 with the upstream edge being positioned downstream of the second start 118. The side diffusion length La is greater than the layback length $L_\beta$ and less than 35 times the diameter D. In some embodiments the layback length $L_\beta$ is less than 4 times the diameter D or zero, and more particularly less than 3. In some further embodiments the layback length $L_\beta$ can be less than zero as measured from the second start 118 to the upstream edge 104 with the upstream edge 104 being positioned upstream of the second start 118, having a length of up to −0.5D, FIG. 8.

The layback diffusion portion 116 further defines a layback diffusion angle β which expands from the second start 118 towards the cool side 86 at a shallow angle measured from the centerline 102 and terminating at the downstream edge 106. In some embodiments, the layback diffusion angle β is less than 12 degrees.

In these embodiments the intentional spacing between the side diffusion angle α in relationship to the layback diffusion angle β results in deeper plunge depths and coverage for similar diffusion area ratios. This enables more stable diffusion to get the coverage required for improved film performance which is dictated by effective coverage.

Typical film holes couple the side diffusion angle and layback diffusion angle at the same location. This limits the layback diffusion length that the film holes can perform due to the high area ratios that one gets with layback. Separating the layback diffusion angle from the side diffusion angle allows for more stable diffusion with long side diffusion length resulting in more coverage. Including the layback diffusion angle after the side diffusion angle allows the film to transition to an effectively lower surface angle before meeting the free stream flow.

Separating side diffusion and layback diffusion locations results in lower area ratios for the same coverage and more stable diffusion. This also allows for lower surface angle placement due to less cavity interference. Both of these result in significant improvement to film performance. This higher film effectiveness translates directly to either durability (increased time on wing) or reduced cooling flow (increased thermal efficiency).

The superior performance of the proposed invention is further driven by reduced mixing between hot gas and coolant at the breakout of the film hole, which is a direct consequence of $L_\beta < L_\alpha$_alpha. This condition allows sufficient coverage and lateral spreading of the film to be achieved via large $L_\alpha$, while constraining the exit of the hole in the dimension normal to the exit surface by having a short $L_\beta$. The latter circumstance limits the turbulent length scales and consequent mixing at the hole exit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A component for a gas turbine engine comprising:
   a hot side exposed to a hot air flow;
   a cool side exposed to a cooling air flow;
   a film hole passage extending between the cool side and the hot side with an inlet on the cool side and an outlet on the hot side and including an upstream edge and a downstream edge, the film hole passage defining a diameter, the film hole passage further defining a side diffusion portion defining a side diffusion length between a start of the side diffusion portion and the outlet, and a layback diffusion portion defining a layback diffusion length between a start of the layback diffusion portion and the upstream edge of the outlet;
   wherein the side diffusion length is greater than the layback diffusion length and the start of the layback diffusion portion is downstream, with respect to the inlet, of a plane intersecting the upstream edge of the outlet and normal to an opposing portion of the side diffusion portion with respect to the upstream edge, the layback diffusion portion defining a layback diffusion angle, β, relative to a centerline of the film hole passage, and wherein the layback diffusion angle β is non-zero with respect to the centerline.

2. The component of claim 1 wherein the layback diffusion length is less than 0.5 times the diameter.

3. The component of claim 1 wherein the side diffusion portion is upstream and spaced from the layback diffusion portion.

4. The component of claim 1 wherein the side diffusion portion defines a side diffusion angle, α, relative to a centerline for the film hole passage, and the side diffusion angle is less than 12.5 degrees.

5. The component of claim 4 wherein the layback diffusion angle is less than 12 degrees.

6. The component of claim 5 wherein the layback diffusion length is less than 4 times the diameter.

7. The component of claim 5 wherein the layback diffusion length is less than four times the diameter and the side diffusion length is less than 35 times the diameter.

8. The component of claim 1 wherein the film hole passage has a diameter less than 0.48 inches.

9. A film hole passage for a component, with a cool side and a hot side, of a gas turbine engine having an inlet on the cool side, an outlet on the hot and including an upstream edge and a downstream edge, a side diffusion portion, and a layback diffusion portion;
   wherein the side diffusion portion is upstream and spaced from the layback diffusion portion and the layback diffusion portion begins at a point downstream, with respect to the inlet, of a plane intersecting an upstream edge of the outlet and normal to an opposing portion of the side diffusion portion with respect to the upstream edge, the layback diffusion portion defining a layback diffusion angle, β, relative to a centerline of the film hole passage, and wherein the layback diffusion angle β is non-zero with respect to the centerline.

10. The film hole passage of claim 9 wherein the side diffusion portion defines a side diffusion angle, α, relative to a centerline for the film hole passage, and the side diffusion angle is less than 12.5 degrees.

11. The film hole passage of claim 9 wherein the layback diffusion angle is less than 12 degrees.

12. The film hole passage of claim 9 wherein the side diffusion portion defines a side diffusion length, the layback diffusion portion defines a layback diffusion length, and side diffusion length is greater than then layback diffusion length.

13. The film hole passage of claim 12 wherein the layback diffusion length is less than 4 times a diameter defined by the film hole passage.

14. The film hole passage of claim 13 wherein the layback diffusion length is less than 4 times the diameter and the side diffusion length is less than 35 times the diameter.

15. The film hole passage of claim 14 wherein the film hole passage has a diameter less than 0.48 inches.

16. The film hole passage of claim 9 wherein the film hole has the following geometry:
   a) the side diffusion portion defines a side diffusion angle, α, relative to a centerline for the film hole passage, and the side diffusion angle is less than 12.5 degrees,
   b) the layback diffusion portion defines a layback diffusion angle, β, relative to a centerline for the film hole passage, and the layback diffusion angle is less than 12 degrees, and
   c) wherein the side diffusion portion defines a side diffusion length, the layback diffusion portion defines a layback diffusion length, and side diffusion length is greater than then layback diffusion length.

17. A film hole passage for a component, with a cool side and a hot side, having an inlet on the cool side, an outlet on the hot side and including an upstream edge and a downstream edge, a side diffusion portion, and a layback diffusion portion;

wherein the side diffusion portion is upstream and spaced from the layback diffusion portion, and the layback diffusion portion defines a layback diffusion length, with a magnitude of the layback diffusion length being greater than zero and less than 4 times a diameter defined by the film hole passage the layback diffusion portion begins at a point downstream, with respect to the inlet, of a plane intersecting an upstream edge of the outlet and normal to an opposing portion of the side diffusion portion with respect to the upstream edge, the layback diffusion portion defining a layback diffusion angle, $\beta$, relative to a centerline of the film hole passage, and wherein the layback diffusion angle $\beta$ is non-zero with respect to the centerline.

18. The film hole passage of claim 17 wherein the film hole has the following geometry:
   a) the side diffusion portion defines a side diffusion angle, $\alpha$, relative to a centerline for the film hole passage, and the side diffusion angle is less than 12 degrees,
   b) the layback diffusion portion defines a layback diffusion angle, $\beta$, relative to a centerline for the film hole passage, and the layback diffusion angle is less than 12.5 degrees, and
   c) wherein the side diffusion portion defines a side diffusion length, the layback diffusion portion defines a layback diffusion length, and side diffusion length is greater than then layback diffusion length.

19. The film hole passage of claim 18 wherein the side diffusion length is less than 35 times the diameter.

* * * * *